US008698853B2

(12) United States Patent
Kim

(10) Patent No.: US 8,698,853 B2
(45) Date of Patent: Apr. 15, 2014

(54) METHOD AND APPARATUS FOR DRIVING LIQUID CRYSTAL DISPLAY

(75) Inventor: Cheol-Min Kim, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 267 days.

(21) Appl. No.: 13/222,716

(22) Filed: Aug. 31, 2011

(65) Prior Publication Data

US 2012/0154345 A1 Jun. 21, 2012

(30) Foreign Application Priority Data

Dec. 16, 2010 (KR) ........................ 10-2010-0129283

(51) Int. Cl.
*G09G 5/10* (2006.01)
*G09G 3/36* (2006.01)
*G09G 5/00* (2006.01)
*G06F 3/038* (2013.01)

(52) U.S. Cl.
USPC .............................. 345/690; 345/204; 345/87

(58) Field of Classification Search
USPC ............................................ 345/87, 204, 690
See application file for complete search history.

(56) References Cited

U.S. PATENT DOCUMENTS 5,905,484 A 5/1999 Verhulst
7,345,663 B2 3/2008 Kobayashi
2001/0038369 A1* 11/2001 Adachi et al. ................... 345/87
2004/0196274 A1* 10/2004 Song et al. .................... 345/204
2006/0038759 A1* 2/2006 Hong et al. ..................... 345/87
2007/0149241 A1 6/2007 Gruber
2008/0158119 A1 7/2008 Park et al.
2010/0245340 A1* 9/2010 Chen et al. .................... 345/214
2010/0302287 A1* 12/2010 Katayama et al. ............ 345/690
2011/0063332 A1* 3/2011 Liao et al. ..................... 345/690

FOREIGN PATENT DOCUMENTS

JP 10-510066 9/1998
JP 2003-66415 3/2003
KR 10-2006-0123456 12/2006
KR 10-2008-0060412 7/2008

* cited by examiner

*Primary Examiner* — Kevin M Nguyen

(74) *Attorney, Agent, or Firm* — Robert E. Bushnell, Esq.

(57) ABSTRACT

The present invention provides a liquid crystal display (LCD) device with reduced response time with respect to input frame data. The present invention also provides an LCD device for performing pre-tilt driving and over-drive driving using only two frame memories. According to the present invention, a method of driving a liquid crystal display (LCD) device comprises generating pre-tilt data with respect to a current frame by using previous frame data and current frame data, generating over-drive data with respect to the current frame by using the previous frame data and the current frame data, displaying the pre-tilt data with respect to the current frame, and displaying the over-drive data with respect to the current frame.

25 Claims, 14 Drawing Sheets

BEFORE OVER-DRIVE IS APPLIED

AFTER OVER-DRIVE IS APPLIED

BEFORE PRE-TILT IS APPLIED

AFTER PRE-TILT IS APPLIED

OVER-DRIVE IS APPLIED

PRE-TILT AND OVER-DRIVE ARE APPLIED

METHOD AND APPARATUS FOR DRIVING LIQUID CRYSTAL DISPLAY

CLAIM OF PRIORITY

This application makes reference to, incorporates the same herein, and claims all benefits accruing under 35 U.S.C. §119 from an application earlier filed in the Korean Intellectual Property Office on 16 Dec. 2010 and there duly assigned Serial No. 10-2010-129283.

BACKGROUND OF THE INVENTION

1. Field of the Invention

The present invention relates to a method and an apparatus for driving a liquid crystal display (LCD) device.

2. Description of the Related Art

A liquid crystal display (LCD) device displays an image corresponding to input data by converting the input data to data voltage at a data driving unit, and by controlling brightness of each of pixels by controlling scans of each of the pixels via a gate driving unit. Each of the pixels of an LCD device includes a liquid crystal capacitor, which is coupled with a gate line and to which data voltage is charged, and a storage capacitor, which is coupled with the liquid crystal capacitor and retains data voltage charged to the liquid crystal capacitor. An image is displayed according to the voltage charged to the liquid crystal capacitor.

SUMMARY OF THE INVENTION

The present invention provides a liquid crystal display (LCD) device with reduced response time with respect to input frame data.

The present invention also provides an LCD device for performing pre-tilt driving and over-drive driving using only two frame memories.

According to an aspect of the present invention, a method of driving a liquid crystal display (LCD) device comprises generating pre-tilt data with respect to a current frame by using previous frame data and current frame data, generating over-drive data with respect to the current frame by using the previous frame data and the current frame data, displaying the pre-tilt data with respect to the current frame, and displaying the over-drive data with respect to the current frame.

A frequency of inputting frame data may be lower than a frequency of driving the LCD device.

The frequency of inputting frame data may correspond to 50% of the frequency of driving the LCD device.

The LCD device may use a first frame memory for storing the current frame data and a second frame memory for storing the previous frame data.

The method may further comprise the steps, when the current frame data is inputted, of storing data of the first frame memory to the second frame memory, and storing the input current frame data to the first frame data.

The method may further comprise compressing the data of the first frame memory before the data of the first frame memory is stored in the second frame memory, and decompressing the data of the second frame memory before the pre-tilt data is generated. The second frame memory may have a smaller storage capacity than the first frame memory.

The data of the first frame memory may be sequentially written to the second frame memory with a pixel array row of the LCD device as a unit, and the input current frame data may be sequentially written to the first frame memory with the pixel array row of the LCD device as a unit.

In the operation of generating the pre-tilt data, the pre-tilt data may be generated by using a pre-tilt look-up table for storing the pre-tilt data determined based on the previous frame data and the current frame data, and, in the operation of generating the over-drive data, the over-drive data may be generated by using an over-drive look-up table for storing the over-drive data determined based on the previous frame data and the current frame data.

The pre-tilt data may be more similar to the previous frame data than to the current frame data.

If the current frame data has a higher gray scale value than the previous frame data, the pre-tilt data may have a higher gray scale value than the previous frame data. If the current frame data has a gray scale value the same as the previous frame data, the pre-tilt data may have the same gray scale value as the previous frame data. Finally, if the current frame data has a lower gray scale value than the previous frame data, the pre-tilt data may have a lower gray scale value than the previous frame data.

The over-drive data may be more similar to the current frame data than to the previous frame data.

If the current frame data has a higher gray scale value than the previous frame data, the over-drive data may have a higher gray scale value than the current frame data. If the current frame data has a gray scale value same as the previous frame data, the over-drive data may have the same gray scale value as the current frame data. Finally, if the current frame data has a lower gray scale value than the previous frame data, the over-drive data may have a lower gray scale value than the current frame data.

According to another aspect of the present invention, an apparatus for driving a liquid crystal display (LCD) device comprises a pre-tilt data generating unit which generates pre-tilt data with respect to a current frame by using previous frame data and current frame data, an over-drive data generating unit which generates over-drive data with respect to the current frame by using the previous frame data and the current frame data, and an output unit which sequentially outputs the pre-tilt data and the over-drive data.

A frequency of inputting frame data may be lower than a frequency of driving the LCD device.

The frequency of inputting frame data may correspond to 50% of the frequency of driving the LCD device.

The apparatus may further comprise a first frame memory for storing the current frame data, and a second frame memory for storing the previous frame data.

When the current frame data is inputted, data of the first frame memory may be stored in the second frame memory, and the inputted current frame data may be stored in the first frame memory.

The apparatus may further comprise a compression unit which compresses the data of the first frame memory and stores the compressed data to the second frame memory, and a decompression unit which decompresses data of the second frame memory and provides the decompressed data to the pre-tilt data generating unit and the over-drive data generating unit. The second frame memory may have a smaller storage capacity than the first frame memory.

The data of the first frame memory may be sequentially written to the second frame memory with a pixel array row of the LCD device as a unit, and the input current frame data may be sequentially written to the first frame memory with the pixel array row of the LCD device as a unit.

The pre-tilt data generating unit may comprise a pre-tilt look-up table (LUT) storage unit which stores a pre-tilt look-up table for storing the pre-tilt data determined based on the previous frame data and the current frame data, and which generates the pre-tilt data by using the pre-tilt look-up table. The over-drive data generating unit may comprise an over-drive LUT storage unit which stores an over-drive look-up table for storing the over-drive data determined based on the previous frame data and the current frame data, and which generates the over-drive data by using the over-drive look-up table.

The pre-tilt data may be more similar to the previous frame data than to the current frame data.

If the current frame data has a higher gray scale value than the previous frame data, the pre-tilt data may have a higher gray scale value than the previous frame data. If the current frame data has a gray scale value same as the previous frame data, the pre-tilt data may have the same gray scale value as the previous frame data. Finally, if the current frame data has a lower gray scale value than the previous frame data, the pre-tilt data may have a lower gray scale value than the previous frame data.

The over-drive data may be more similar to the current frame data than to the previous frame data.

If the current frame data has a higher gray scale value than the previous frame data, the over-drive data may have a higher gray scale value than the current frame data. If the current frame data has a gray scale value same as the previous frame data, the over-drive data may have the same gray scale value as the current frame data. Finally, if the current frame data has a lower gray scale value than the previous frame data, the over-drive data may have a lower gray scale value than the current frame data.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
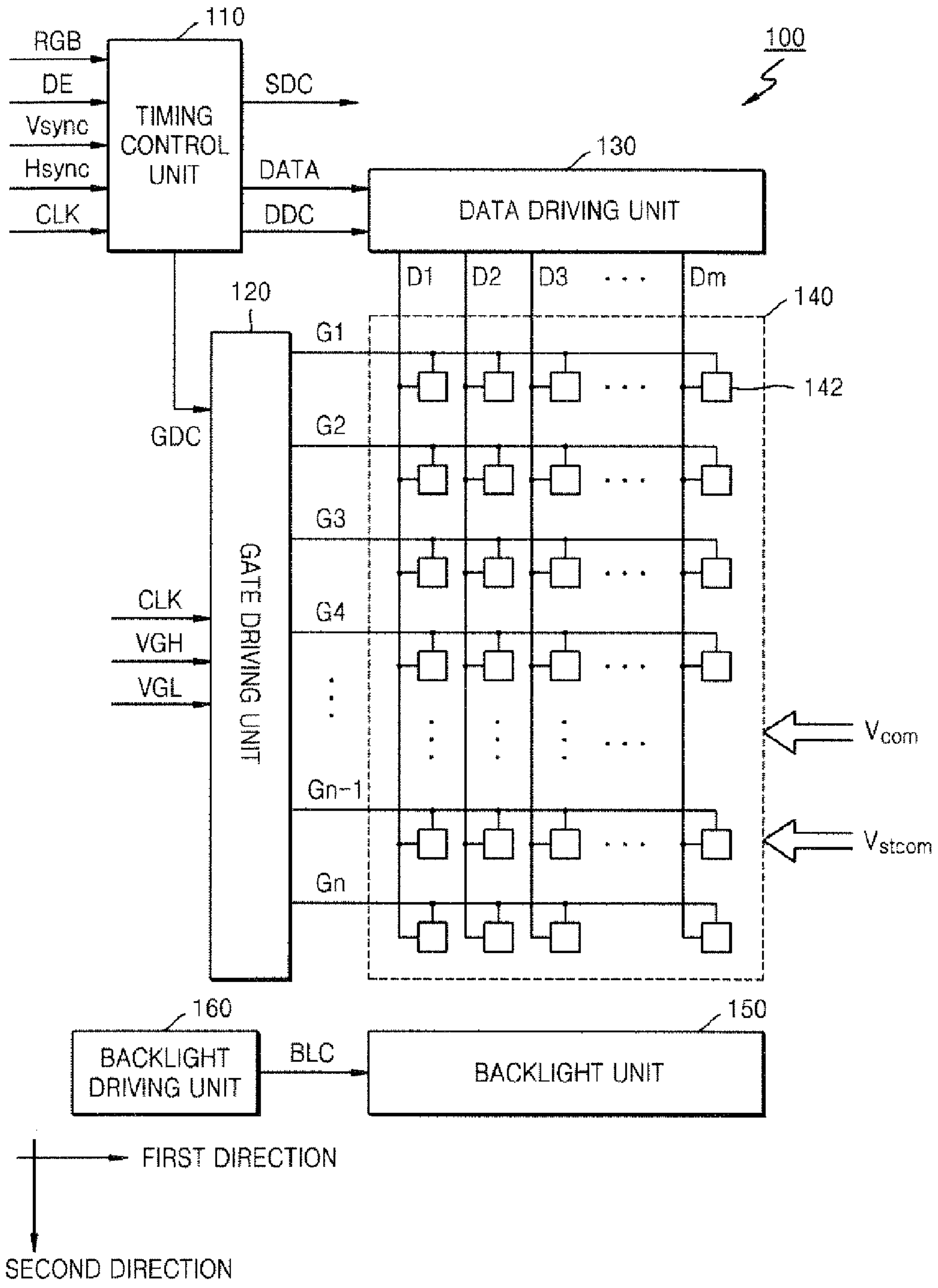
FIG. 1 is a diagram showing the structure of a liquid crystal display (LCD) device according to an embodiment of the present invention.

The present invention will now be described more fully with reference to the accompanying drawings, in which exemplary embodiments of the invention are shown. In the description of the present invention, if it is determined that a detailed description of commonly-used technologies or structures related to the invention may unnecessarily obscure the subject matter of the invention, the detailed description will be omitted. Also, since later-described terms are defined in consideration of the functions of the present invention, they may vary according to users' intentions or practice. Hence, the terms must be interpreted based on the contents of the entire specification.

It will be understood that, when an element or layer is referred to as being "connected to" or "coupled to" another element, the element or layer can be directly connected or coupled to another element or intervening elements.

In contrast, when an element is referred to as being "directly connected to" or "directly coupled to" another element, there are no intervening elements present. Like reference numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only, and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning which is consistent with their meaning in the context of the relevant art, and should not be interpreted in an idealized or overly formal sense unless expressly so defined herein.

Hereinafter, embodiments of the present invention will be described with reference to accompanying drawings.

FIG. 1 is a diagram showing the structure of a liquid crystal display (LCD) device according to an embodiment of the present invention.

The LCD device 100 according to the present embodiment includes a timing control unit 110, a gate driving unit 120, a data driving unit 130, a pixel unit 140, a backlight unit 150, and a backlight driving unit 160.

The timing control unit 110 receives input image signals R, G, and B, a data enabling signal DE, a vertical synchronization signal Vsync, a horizontal synchronization signal Hsync, and a clock signal CLK, and generates an image data signal DATA, a data driving control signal DDC, and a gate driving control signal GDS. Here, the input image signals R, G, and B may be input frame data. Furthermore, according to embodiments of the present invention, the image data signal DATA may include pre-tilt data and over-drive data. The timing control unit 110 receives input control signals, such as the horizontal synchronization signal Hsync, the clock signal CLK, and the data enabling signal DE, and outputs the data driving control signal DDC. Here, the data driving control signal DDC is a signal for controlling operation of the data driving unit 130 and includes a source shift clock SSC, a source start pulse SSP, a polarity control signal POL, and a source output enabling signal. Furthermore, the timing control unit 110 receives the vertical synchronization signal Vsync and the clock signal CLK, and outputs the gate driving control signal GDC. The gate driving control signal GDC is a signal for controlling operation of the gate driving unit 120, and includes a gate start pulse GSP and a gate output enabling signal GOE.

The gate driving unit 120 sequentially generates scan pulses (that is, gate pulses) in correspondence to the gate driving control signals GDC supplied by the timing control unit 110 and supplies the scan pulses to gate lines G1 thru Gn. Here, the gate driving unit 120 decides voltage levels of each of scan pulses according to a gate high voltage VGH and a gate low voltage VGL. Voltage level of a scan pulse may vary according to the type of a switching device M1 included in a pixel 142. In other words, if the switching device M1 is formed of an n-type transistor, a scan pulse has the gate high voltage VGH during activation period. If the switching device M1 is formed of a p-type transistor, a scan pulse has the gate low voltage VGL during activation period.

The data driving unit 130 supplies data voltage to data lines D1 thru Dm in correspondence to the image data signal DATA and the data driving control signal DDC supplied by the timing control unit 110. In detail, the data driving unit 130 samples and latches the image data signal DATA supplied by the timing control unit 110 and converts the image data signal DATA to an analog data voltage with which the pixels 142 of the pixel unit 140 may display gray scales based on a gamma reference voltage supplied by a gamma reference voltage circuit (not shown).

The pixel unit 140 includes a plurality of pixels 142 which are located near points where the data lines D1 thru Dm and the gate lines G1 thru Gn cross each other. Each of the pixels 142 is connected to at least one data line Di, at least one gate line Gj, and a storage common voltage line. The gate lines G1 thru Gn extend in a first direction and are arranged in parallel with each other, whereas the data lines D1 thru Dm extend in a second direction and are arranged in parallel with each other. Alternatively, the gate lines G1 thru Gn may extend in the second direction, and the data lines D1 thru Dm may extend in the first direction. The structure of the pixel 142 will be described below in greater detail with reference to FIG. 2.

The backlight unit 150 is arranged behind the pixel unit 140, is illuminated by a backlight driving signal BLC supplied by the backlight driving unit 160, and emits light to the pixels 142 of the pixel unit 140. According to control of the timing control unit 110, the backlight unit 160 controls light illumination of the backlight unit 150 by generating the backlight driving signal BLC and outputting the backlight driving signal BLC to the backlight unit 150.

Figure 2:
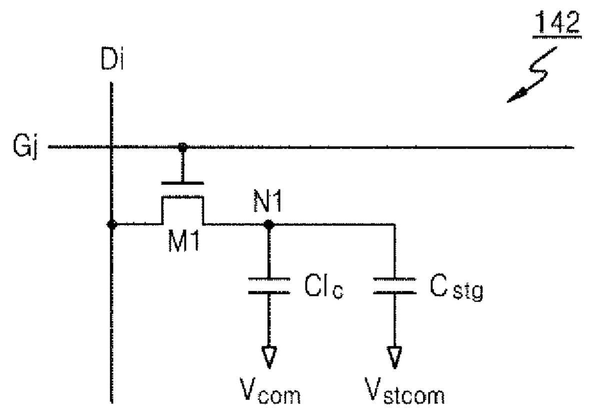
FIG. 2 is a diagram showing the structure of a pixel according to an embodiment of the present invention.

FIG. 2 is a diagram showing the structure of a pixel according to an embodiment of the present invention.

The pixel 142 according to an embodiment of the present invention includes a switching device M1, a liquid crystal capacitor Clc, and a storage capacitor Cstg. Here, the pixel 142 includes the liquid crystal capacitor Clc, the upper and lower substrates of an LCD panel (more particularly, common electrode and pixel electrode formed on the upper and lower substrates), and a liquid crystal layer formed therebetween. The switching device M1 includes a gate electrode connected to the gate line Gj, a first electrode connected to the data line Di, and a second electrode connected to a first node N1. The switching device M1 may be formed of a thin-film transistor (TFT). The first node N1 is a node electrically equivalent to the pixel electrode. The liquid crystal capacitor Clc is connected between the first node N1 and the source of a common voltage Vcom. The common voltage Vcom may be applied via the common electrode. The liquid crystal capacitor Clc is equivalent to the pixel electrode, the common electrode, and the liquid crystal layer interposed therebetween. The storage capacitor Cstg is connected between the first node N1 and the source of a storage common voltage Vstcom.

When a scan pulse is inputted to the gate line Gj, the switching device M1 is turned on, and a data voltage inputted via the data line Di is applied to the first node N1. As the data voltage is applied to the first node N1, a voltage level corresponding to the data voltage is stored in the storage capacitor Cstg. The arrangement of the liquid crystal layer is changed according to the voltage of the first node N1, and thus light transmittance of the liquid crystal layer is changed.

Figure 3:
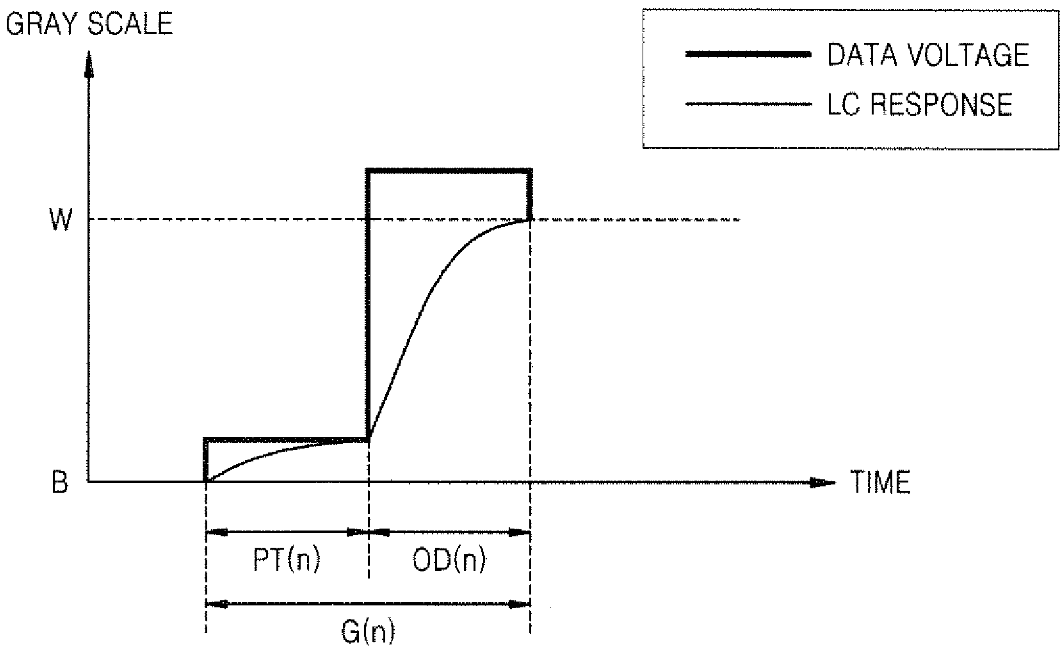
FIG. 3 is a graph for describing a method of driving the LCD device according to an embodiment of the present invention.

FIG. 3 is a graph for describing a method of driving the LCD device according to an embodiment of the present invention.

According to embodiments of the present invention, pre-tilt data PT(n) and over-drive data OD(n) are generated with respect to single frame data G(n) and are inputted to each of the pixels 142. If a frequency of inputting input frame data is lower than a frequency of driving the LCD device 100, the LCD device 100 may display a plurality of frames while single frame data is being inputted. In the embodiments of the present invention, if a frequency of inputting input frame data is lower than a frequency of driving the LCD device 100, the pre-tilt data PT(n) and the over-drive data OD(n) are generated, are inputted to each of the pixels 142, and are displayed while single frame data is being inputted.

Figure 4:
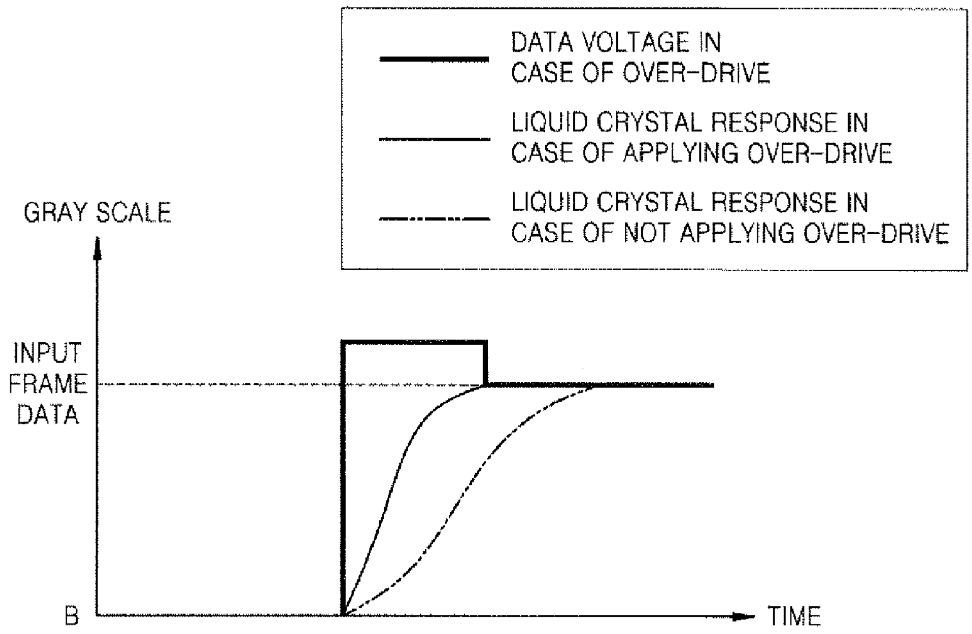
FIGS. 4, 5A and 5B are diagrams for describing the effects of over-drive driving.
Figure 5A:
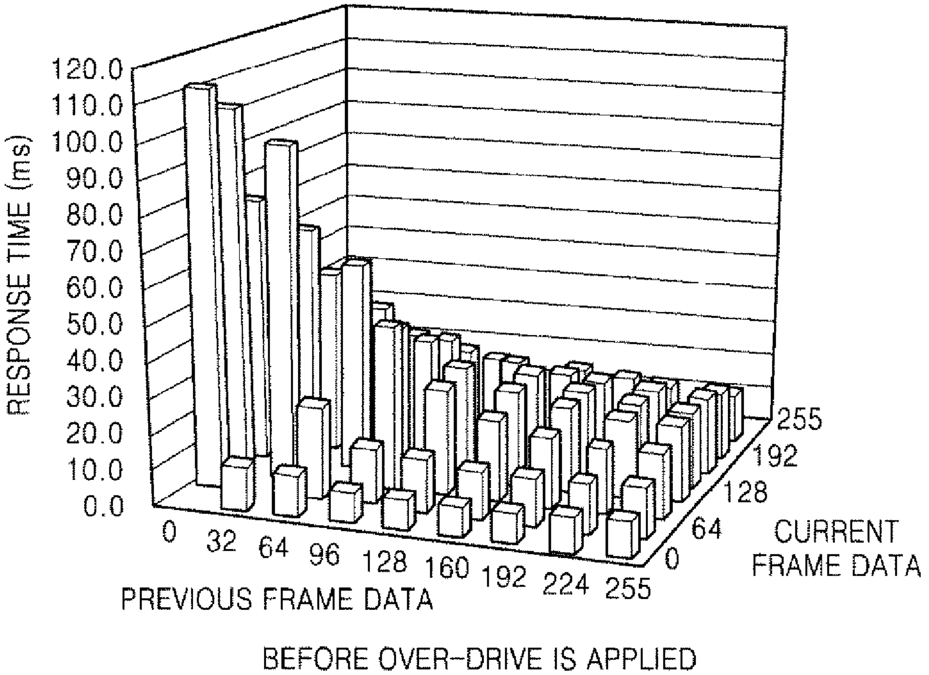
Figure 5B:
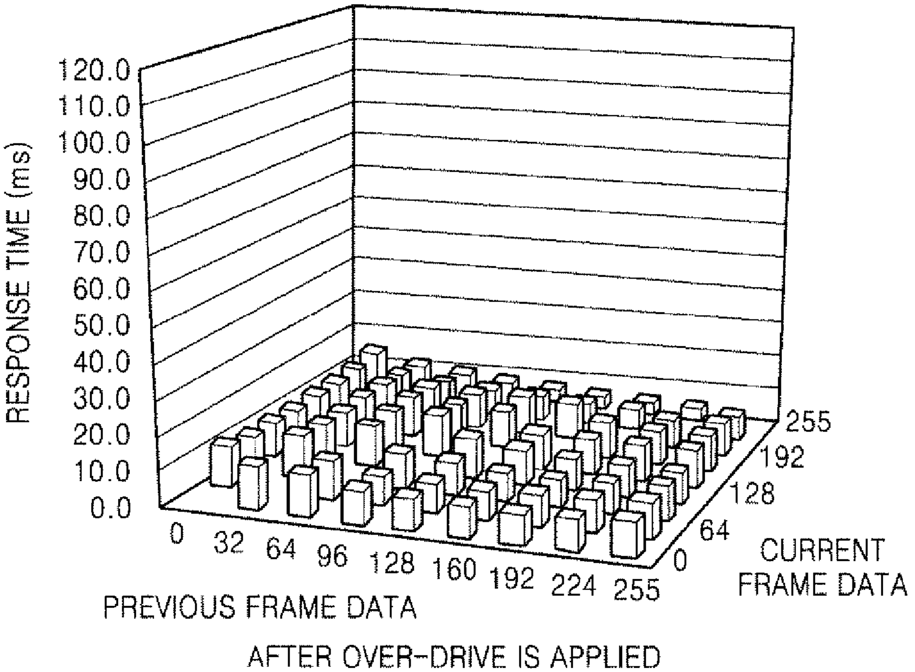

FIGS. 4, 5A and 5B are diagrams for describing the effects of over-drive driving.

The term 'over-drive' refers to the application of a data voltage corresponding to a gray scale value higher than that of input frame data in the case where input frame data increases between input frames and the application of a data voltage corresponding to a gray scale value lower than that of the input frame data in the case where the input frame data decreases between input frames. The over-drive driving method may employ a dynamic capacitance compensation algorithm. As shown in FIG. 4, if input frame data of an $n^{th}$ frame is larger than the input frame data of an $(n-1)^{th}$ frame, a data voltage corresponding to a higher gray scale value, as compared to the input frame data of the $n^{th}$ frame, is inputted to the pixel 142 so as to display the $n^{th}$ frame according to the over-drive driving method, and response time of an LCD device is reduced as compared to the case of not applying the over-drive driving method. Referring to FIG. 5, it is clear that the response time of an LCD device is reduced throughout the entire gray scale domain of previous frame data G(n−1) and current frame data G(n).

The over-drive data OD(n) is determined to be more similar to the current frame data G(n) than to the previous frame data G(n−1). Furthermore, if the current frame data G(n) has a higher gray scale value than the previous frame data G(n−1), the over-drive data OD(n) may have a higher gray scale value than the current frame data G(n). If the current frame data G(n) has a gray scale value the same as that of the previous frame data G(n−1), the over-drive data OD(n) may have a gray scale value the same as that of the current frame data G(n). If the current frame data G(n) has a lower gray scale value than the previous frame data G(n−1), the over-drive data OD(n) may have a lower gray scale value than the current frame data G(n).

Figure 6A:
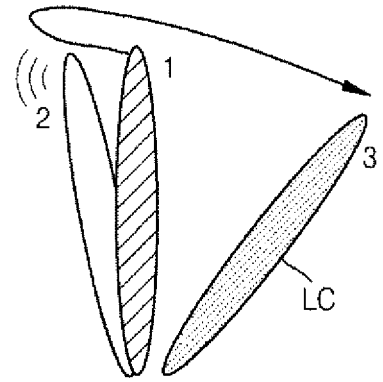
FIGS. 6A and 6B are diagrams for describing the principle of pre-tilt.
Figure 6B:
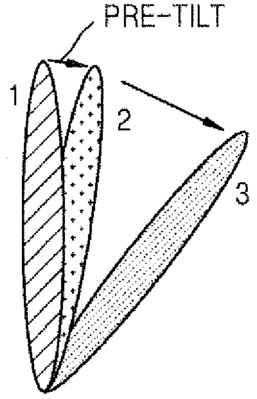
Figure 7A:
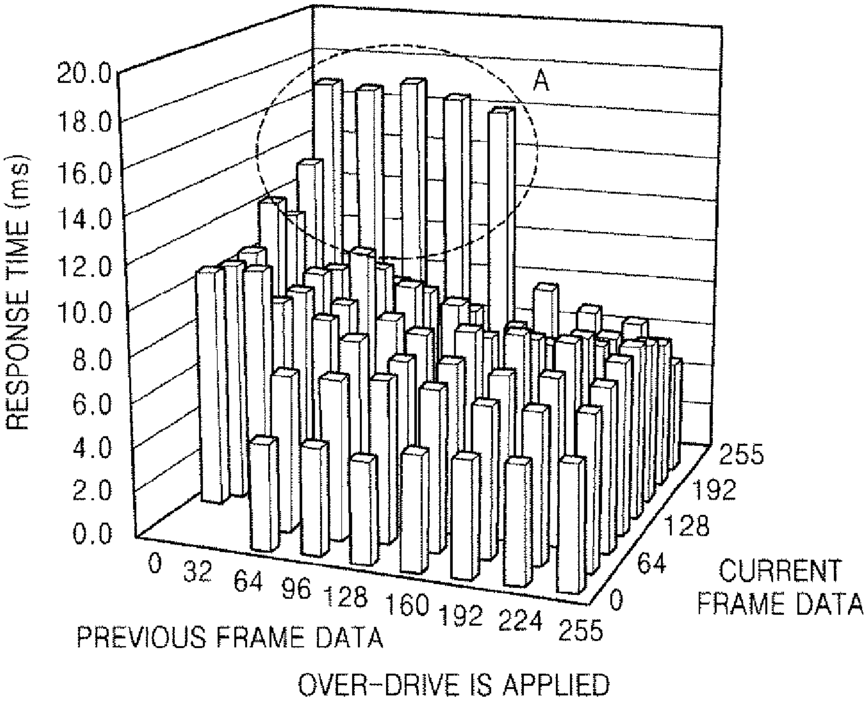
FIGS. 7A and 7B are graphs showing the effects of pre-tilt driving.
Figure 7B:
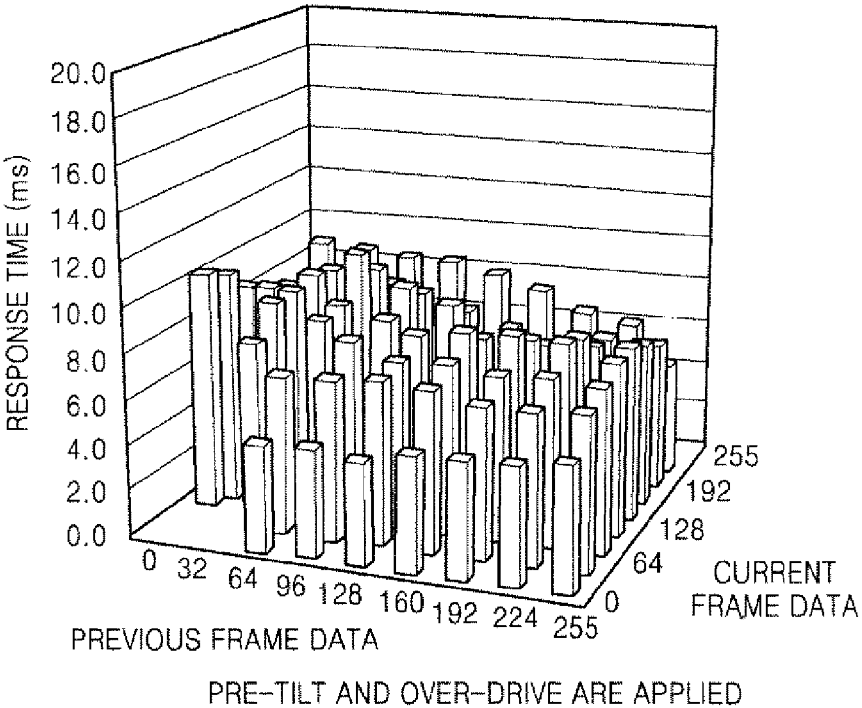

FIGS. 6A and 6B are diagrams for describing the principle of pre-tilt, and FIGS. 7A and 7B are graphs showing the effects of pre-tilt driving.

The term 'pre-tilt' refers to moving the arrangement of liquid crystal by a predetermined distance in a direction in which the liquid crystal is to be moved. When images are changed, a direction in which the liquid crystal is to be moved is set by the pre-tilt, and thus delays in response due to incorrect setting of a direction, in which the liquid crystal is to be moved, during the initial stage of changing frame may be prevented. Referring to FIG. 6A, without the pre-tilt, liquid crystal may be moved in a direction opposite to the direction in which it is supposed to be moved. The phenomenon occurs more frequently in the case of moving liquid crystal from a high gray scale to a low gray scale in a vertical alignment (VA) type LCD device. In the embodiments of the present invention, as shown in FIG. 6B, the pre-tilt driving method is applied to move liquid crystal from a first arrangement to a second arrangement, and the liquid crystal may be quickly moved from the second arrangement to a third arrangement by applying the over-drive driving method.

According to an embodiment of the present invention, the pre-tilt data PT(n) may be determined to be more similar to the previous frame data G(n−1) than to the current frame data G(n). However, the present invention is not limited thereto, and the pre-tilt data PT(n) may vary. Furthermore, if the current frame data G(n) has a higher gray scale value than the previous frame data G(n−1), the pre-tilt data PT(n) may have a higher gray scale value than the previous frame data G(n−1). If the current frame data G(n) has a gray scale value the same as that of the previous frame data G(n−1), the pre-tilt data PT(n) may have a gray scale value the same as that of the previous frame data G(n−1). If the current frame data G(n) has a lower gray scale value than the previous frame data G(n−1), the pre-tilt data PT(n) may have a lower gray scale value than the previous frame data G(n−1).

In the case of applying the pre-tilt driving method and the over-drive driving method as in the embodiments of the present invention, the response time of an LCD device may be further reduced compared to the case of applying the over-drive driving method only as shown in FIGS. 7A and 7B. In particular, the response time of an LCD device is significantly reduced in the case where an image is changed from low gray scale to high gray scale (see portion A of FIG. 7A).

Figure 8:
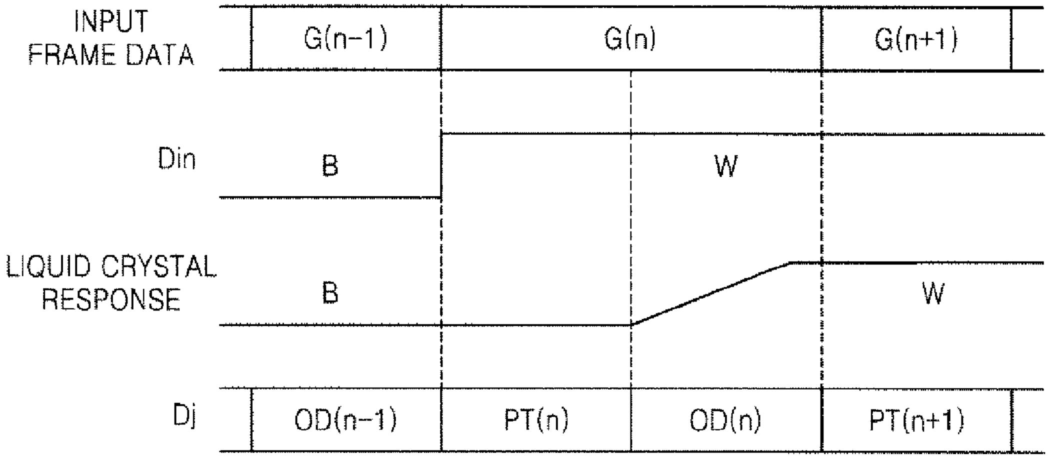
FIG. 8 is a diagram for describing a method of driving an LCD device according to an embodiment of the present invention.

FIG. 8 is a diagram for describing a method of driving an LCD device according to an embodiment of the present invention.

FIG. 8 shows the case where input frame data Din is changed from low gray scale B to high gray scale W while it is being switched from the $(n-1)^{th}$ frame to the $n^{th}$ frame. In FIG. 8, Din indicates the gray scale value of input frame data, and Dj indicates a data voltage input to the pixel electrode 142 at the $j^{th}$ column. A data voltage corresponding to Dj is applied to each of the pixels 142. The present invention is not limited to a PVA type LCD device, and may be applied to various types of LCD devices.

As shown in FIG. 8, according to embodiments of the present invention, while input frame data of a single frame is being inputted, the pre-tilt data PT(n) and the over-drive data OD(n) are generated, and data voltages corresponding to the pre-tilt data PT(n) and the over-drive data OD(n), respectively, are applied to each of the pixels 142. The arrangement of the liquid crystal is slightly or hardly changed when the pre-tilt data PT(n) is applied thereto, but it is rapidly changed when the over-drive data OD(n) is applied thereto.

Figure 9:
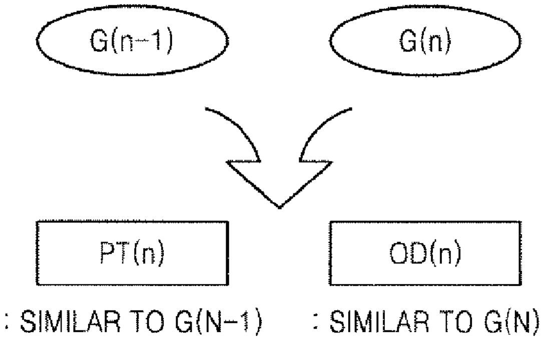
FIG. 9 is a diagram for describing generation of the pre-tilt data PT(n) and the over-drive data OD(n) according to embodiments of the present invention.

FIG. 9 is a diagram for describing generation of the pre-tilt data PT(n) and the over-drive data OD(n) according to embodiments of the present invention.

In the embodiments of the present invention, the pre-tilt data PT(n) and the over-drive data OD(n), with respect to the current frame data G(n), are generated by using the previous frame data G(n−1) and the current frame data G(n). In the embodiments of the present invention, since the frequency of driving the LCD device 100 is higher than the frequency of inputting input frame data, the pre-tilt data PT(n) and the over-drive data OD(n) may be generated during a period of inputting the current frame data G(n), and at least the pre-tilt data PT(n) may be displayed during the period of inputting the current frame data G(n).

Figure 10:
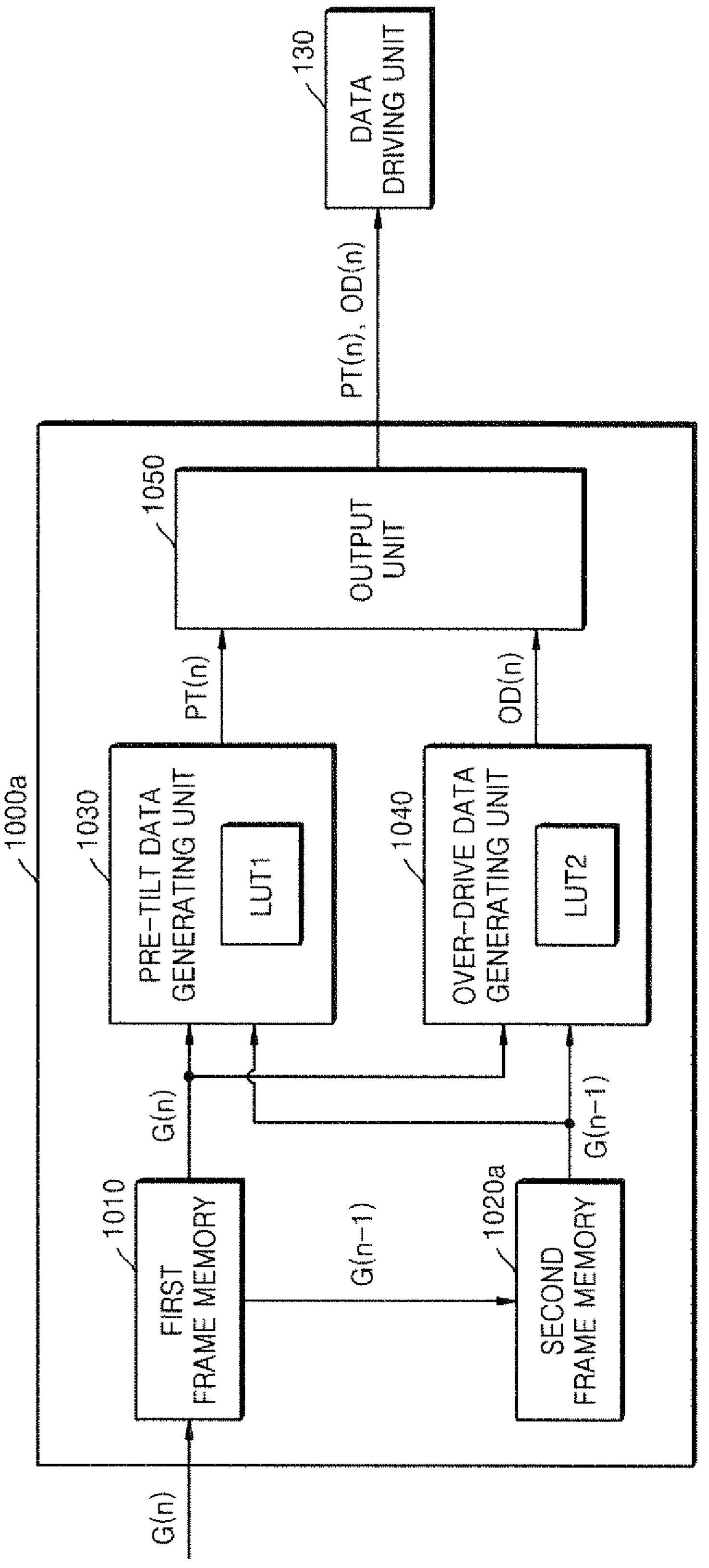
FIG. 10 is a schematic block diagram showing the structure of an LCD device driving device according to an embodiment of the present invention.

FIG. 10 is a schematic block diagram showing the structure of an LCD device driving device according to an embodiment of the present invention.

Referring to FIG. 10, the LCD device driving device **1000*a* may be included in the timing control unit 110 shown in FIG. 1, or in a separate graphic processing unit (not shown). The pre-tilt data PT(n) and the over-drive data OD(n) generated by the LCD device driving device 1000*a* are outputted to the data driving unit 130, are converted by the data driving unit 130 to data voltages using a gamma filter or the like, and are applied to each of the pixels 142**.

The LCD device driving device **1000*a*, according to an embodiment of the present invention, generates the pre-tilt data PT(n) and the over-drive data OD(n) by using a look-up table. In that regard, according to an embodiment of the present invention, the pre-tilt data PT(n) and the over-drive data OD(n) may be generated by using only two frame memories. The LCD device driving device 1000*a*, according to an embodiment of the present invention, includes a first frame memory 1010, a second frame memory 1020*a*, a pre-tilt data generating unit 1030, an over-drive data generating unit 1040, and an output unit 1050. The LCD device driving device 1000*a***, according to embodiments of the present invention, receives inputs of the previous frame data G(n−1) and the current frame data G(n), and generates the pre-tilt data PT(n) and the over-drive data OD(n).

The first frame memory 1010 stores the current frame data G(n), whereas the second frame memory **1020*a* stores the previous frame data G(n−1). When the current frame data G(n) is inputted to the LCD device driving device 1000*a*, the previous frame data G(n−1) stored in the first frame memory 1010 may be written to the second frame memory 1020*a*, and the current frame memory G(n) may be written to the first frame memory 1010. Data may be written to the first frame memory 1010 and the second frame memory 1020*a* with a predetermined block of frame data as a unit. For example, data may be written with data corresponding to one row of the pixel unit 140 as a unit, and data may be written to the first frame memory 1010 and the second frame memory 1020***a* in various ways.

In a conventional method of driving an LCD device, that is, the conventional method not employing the pre-tilt driving method and the over-drive driving method, a frame memory may not be used as in an RGB interface or one frame memory may be used as in a central processing unit (CPU) interface. According to embodiments of the present invention, in the case of an interface not using a frame memory, such as the RGB interface, the pre-tilt driving method and the over-drive driving method may be applied by simply adding two frame memories. In the case of an interface using one frame memory, such as the CPU interface, the pre-tilt driving method and the over-drive driving method may be applied by simply adding one frame memory.

The pre-tilt data generating unit 1030 generates the pre-tilt data PT(n) by using the current frame data G(n) stored in the first frame memory 1010 and the previous frame data G(n−1) stored in the second frame memory 1020*a*. The pre-tilt data generating unit 1030 includes a pre-tilt look-up table (LUT) storage unit LUT 1 having a pre-tilt look-up table for storing pre-tilt data determined based on the current frame data G(n) and the previous frame data G(n−1), and it may generate the pre-tilt data PT(n) by using the look-up table.

For example, if the current frame data G(n) has a higher gray scale value than the previous frame data G(n−1), pre-tilt data which has a higher gray scale value than the previous frame data G(n−1) and which is similar to the previous frame data G(n−1) may be stored in the pre-tilt look-up table. If the current frame data G(n) has a gray scale value the same as the previous frame data G(n−1), pre-tilt data which is the same as the previous frame data G(n−1) may be stored in the pre-tilt look-up table. If the current frame data G(n) has a lower gray scale value than the previous frame data G(n−1), pre-tilt data which has a lower gray scale value than the previous frame data G(n−1) and which is similar to the previous frame data G(n−1) may be stored in the pre-tilt look-up table.

The over-drive data generating unit 1040 generates the over-drive data OD(n) by using the current frame data G(n) stored in the first frame memory 1010 and the previous frame data G(n−1) stored in the second frame memory 1020*a*. The over-drive data generating unit 1040 includes an over-drive LUT storage unit LUT2 having an over-drive look-up table for storing over-drive data determined based on the current frame data G(n) and the previous frame data G(n−1), and may generate the over-drive data OD(n) by using the look-up table.

For example, if the current frame data G(n) has a higher gray scale value than the previous frame data G(n−1), over-drive data which has a higher gray scale value than the current frame data G(n) and which is similar to the current frame data G(n) may be stored in the over-drive look-up table. If the current frame data G(n) has a gray scale value the same as the previous frame data G(n−1), over-drive data which is the same as the current frame data G(n) may be stored in the over-drive look-up table. If the current frame data G(n) has a lower gray scale value than the previous frame data G(n−1), over-drive data which has a lower gray scale value than the current frame data G(n) and which is similar to the current frame data G(n), may be stored in the over-drive look-up table.

The output unit 1050 sequentially outputs the pre-tilt data PT(n) and the over-drive data OD(n) to the data driving unit 130. The output unit 150 is configured to output the pre-tilt data PT(n) and the over-drive data OD(n) in the order stated.

Figure 11:
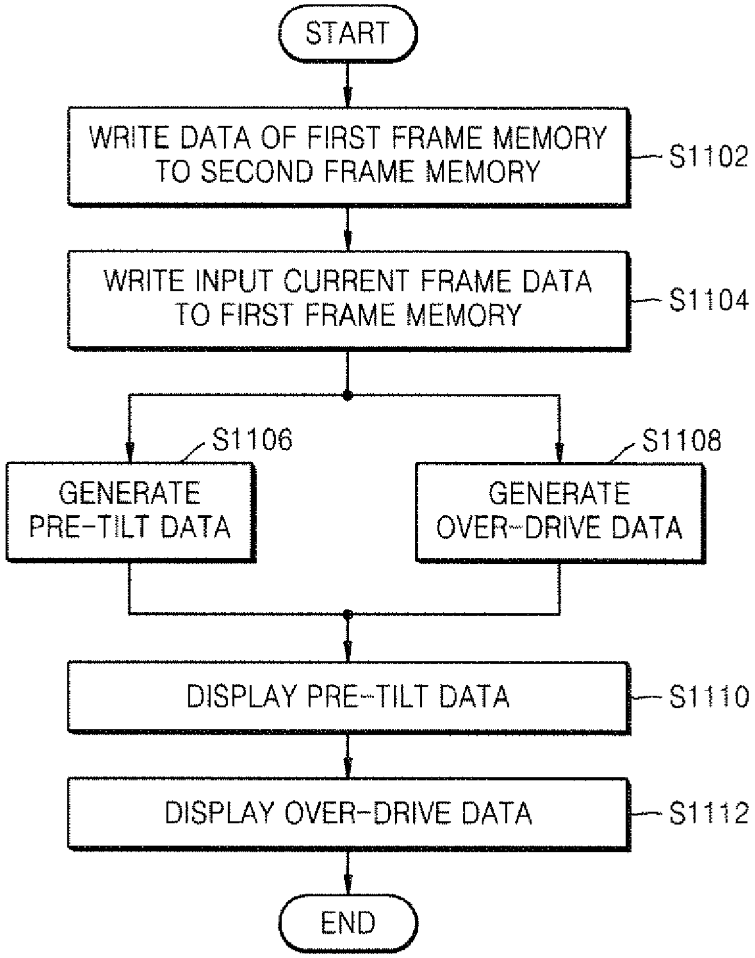
FIG. 11 is a flowchart showing a method of driving an LCD device according to an embodiment of the present invention.

FIG. 11 is a flowchart showing a method of driving an LCD device according to an embodiment of the present invention.

First, before the current frame data G(n) is written to the first frame memory 1010, the previous frame data G(n−1) stored in the first frame memory 1010 is written to the second frame memory 1020*a* (operation S1102), and the input current frame data G(n) is written to the first frame memory 1010 (operation S1104).

Next, the pre-tilt data PT(n) and the over-drive data OD(n) are generated by using the current frame data G(n) and the previous frame data G(n−1) (operations S1106 and S1108). The pre-tilt data PT(n) and the over-drive data OD(n) may be generated either simultaneously or sequentially.

Next, the pre-tilt data PT(n) is inputted to the pixel unit 140 and is displayed (operation S1110), and then the over-drive data OD(n) is inputted to the pixel unit 140 and is displayed (operation S1112).

Figure 12:
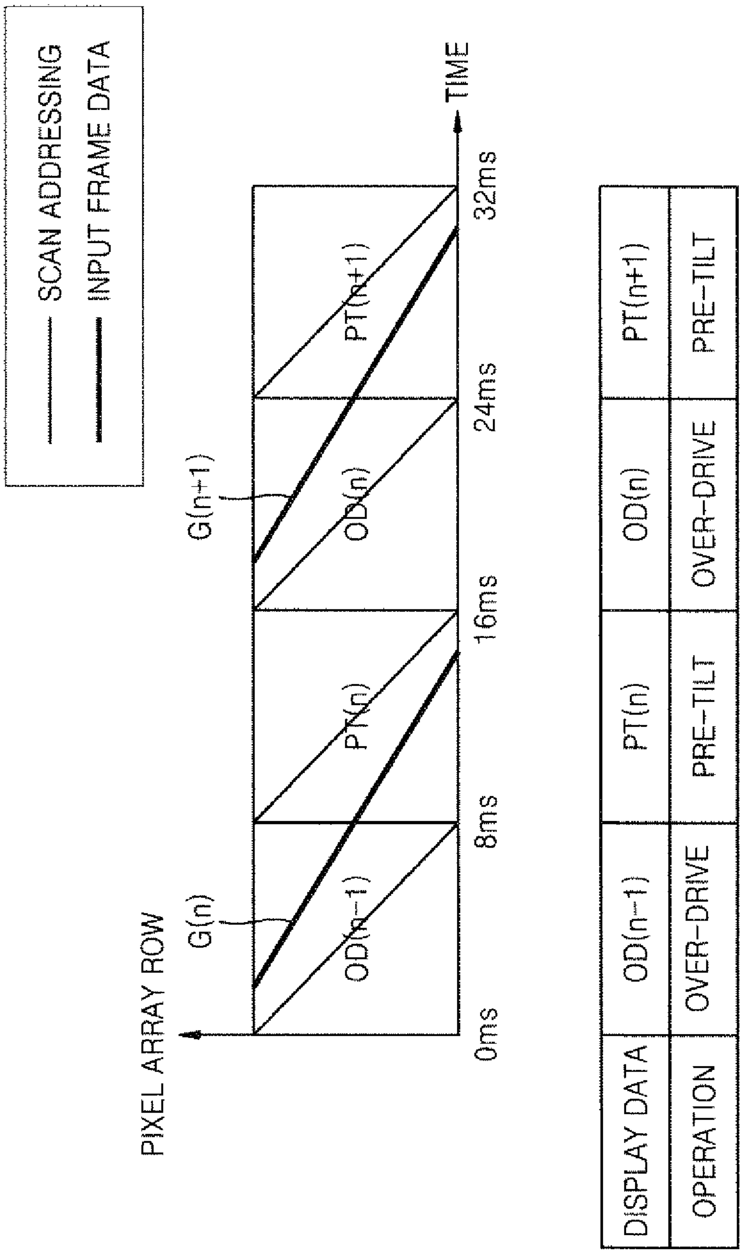
FIGS. 12 thru 14 are diagrams showing an example of driving an LCD device according to an embodiment of the present invention.
Figure 13:
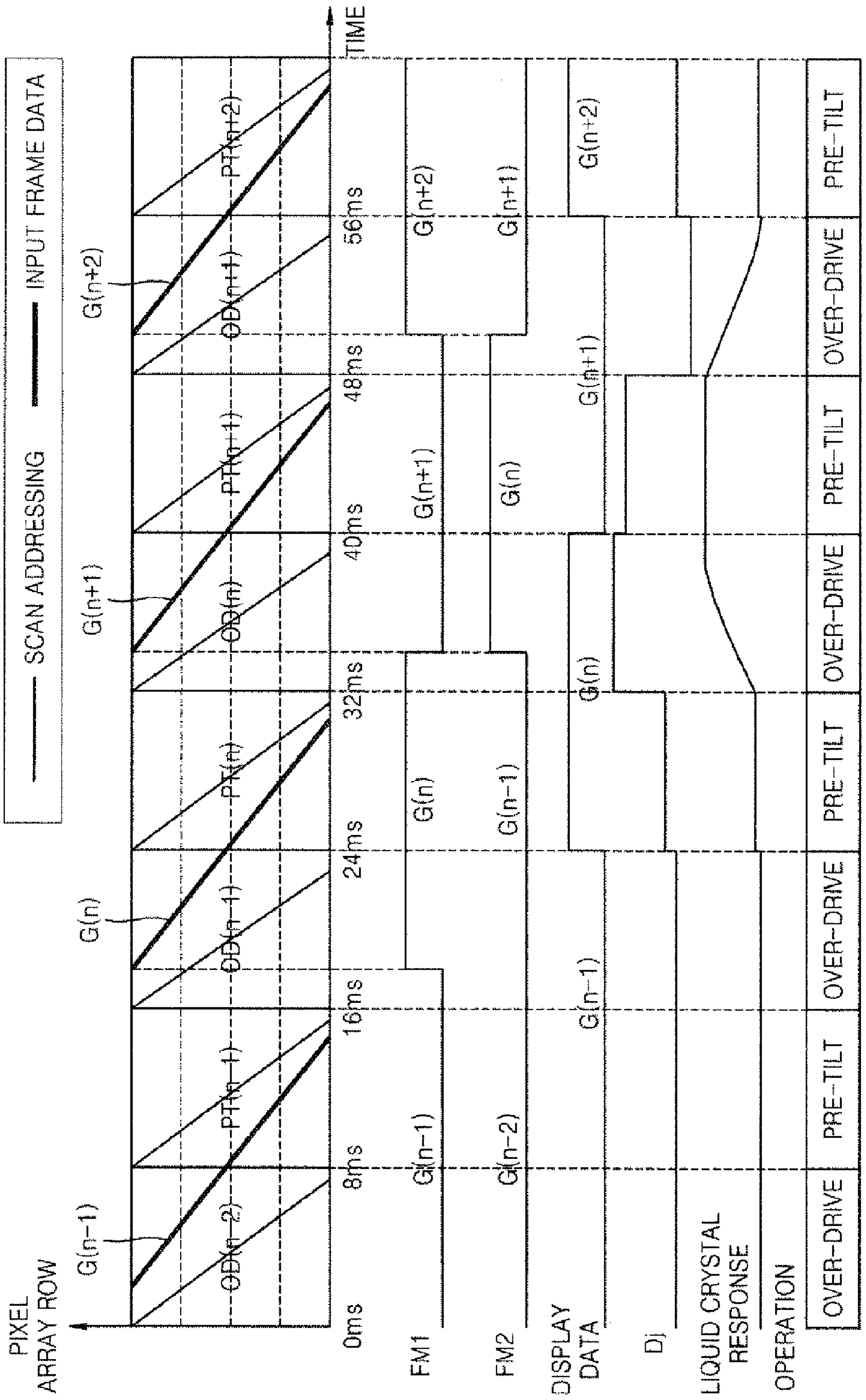
Figure 14:
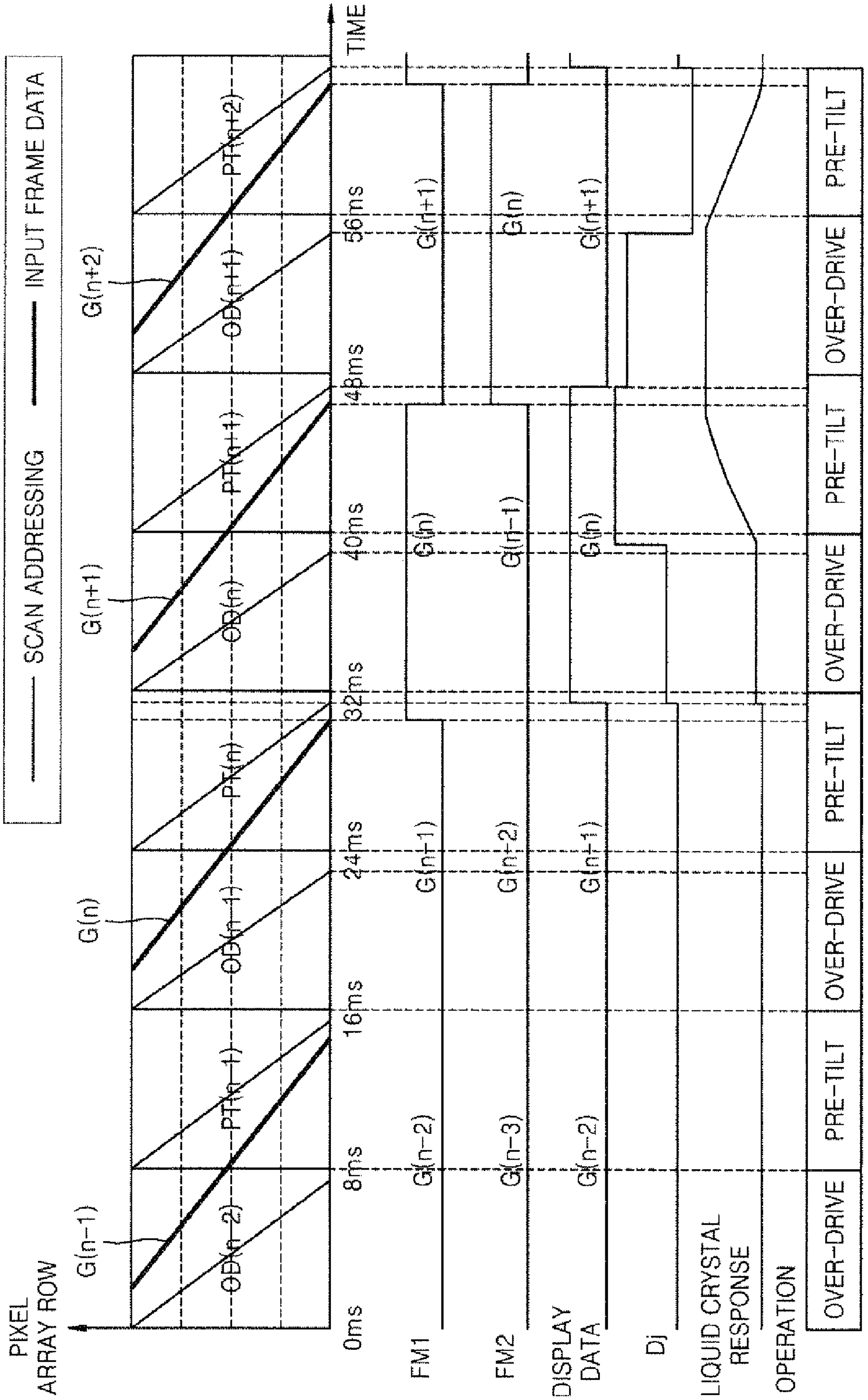

FIGS. 12 thru 14 are diagrams showing an example of driving an LCD device according to an embodiment of the present invention.

In the case shown in FIGS. 12 thru 14, a frequency of inputting input frame data is 60 frames per second (FPS), and a frequency of driving the LCD device 100 is 120 Hz. In that regard, the frequency of driving the LCD device 100 indicates the number of frames which may be displayed per second. Scan addressing refers to the timing with which gate pulses with gate-on level are inputted to each of pixel array rows and data voltages and are programmed to each of the pixels 142.

As shown in FIG. 12, the input frame data G(n) may be sequentially inputted with a pixel array row as a unit. The pre-tilt data PT(n) and the over-drive data OD(n) with respect to the current frame data G(n) are displayed before next frame data G(n+1) is inputted to each of the pixel array rows, and the pre-tilt driving method and the over-drive driving method may be applied by using two frame memories only. Furthermore, since the frequency of inputting input frame data is lower than the frequency of driving the LCD device 100, the pre-tilt data PT(n) and the over-drive data OD(n) may be separately displayed as individual frames.

FIG. 13 is a diagram showing the operation of the first pixel array row, and FIG. 14 is a diagram showing the operation of the last pixel array row.

In FIGS. 13 and 14, FM1 indicates frame data written to the first frame memory 1010, FM2 indicates frame data written to the second frame memory 1020*a*, DISPLAY DATA indicates data programmed to each of the pixels 142, Dj indicates a data voltage input to the pixels 142 at the $j^{th}$ column, LIQUID CRYSTAL RESPONSE indicates response of the liquid crystal of each of the pixels 142, and OPERATION indicates whether operation at a corresponding period is a pre-tilt operation or an over-drive operation.

As shown in FIGS. 13 and 14, according to embodiments of the present invention, pre-tilt data or over-drive data are sequentially inputted to the first frame memory 1010, the second frame memory 1020*a*, and each of the pixels 142 with a pixel array row as a unit.

Figure 15:
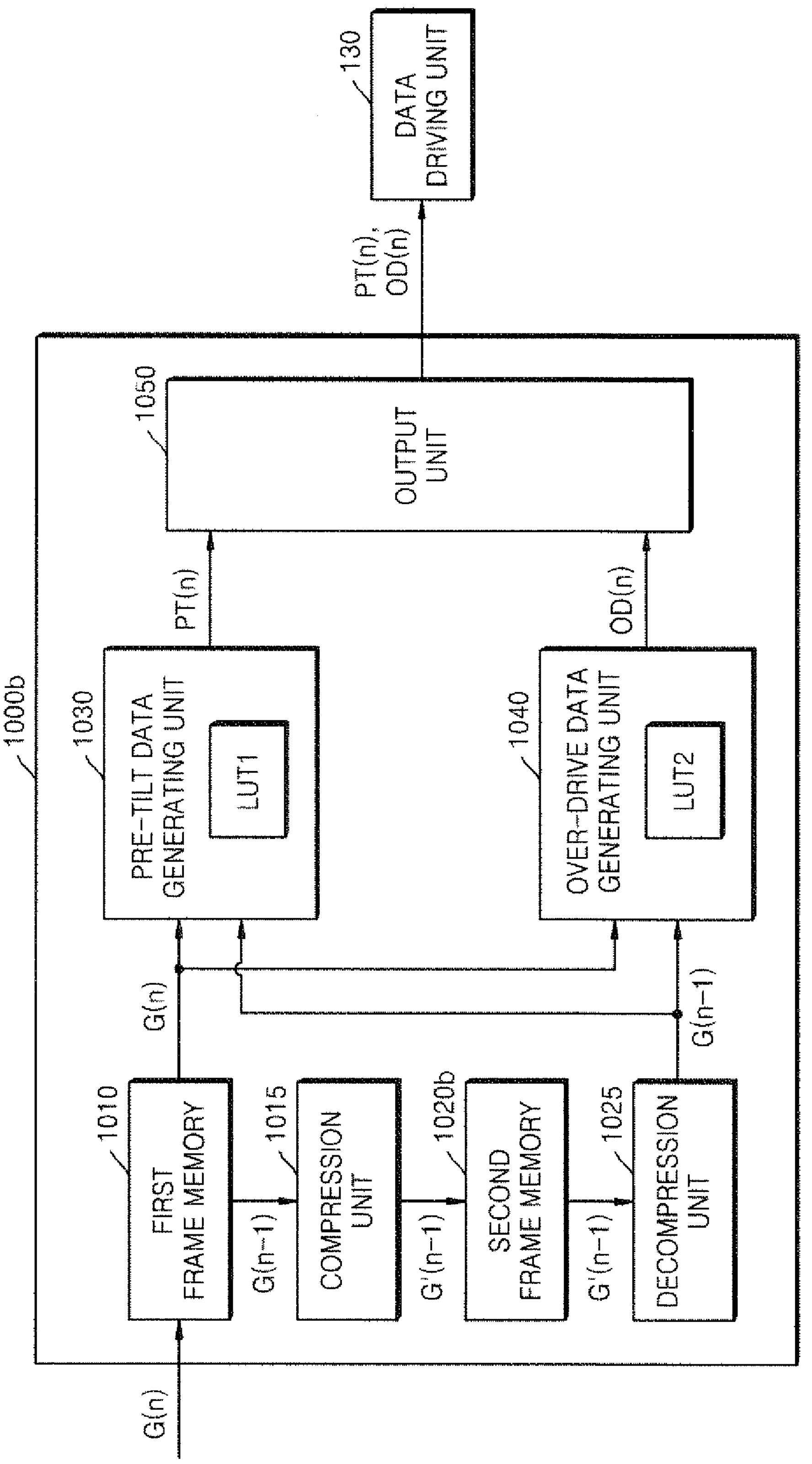
FIG. 15 is a schematic block diagram showing the structure of an LCD device driving device according to another embodiment of the present invention.

FIG. 15 is a schematic block diagram showing the structure of an LCD device driving device according to another embodiment of the present invention.

When the previous frame data G(n−1) is stored in a second frame memory 1020*b*, the LCD device driving device 1000*b* according to the present embodiment reduces the capacity of the second frame memory 1020*b* occupied by the previous frame data G(n−1) by compressing the previous frame data G(n−1). The LCD device driving device 1000*b* according to the present embodiment includes the first frame memory 1010, a compression unit 1015, the second frame memory

1020*b*, a decompression unit 1025, the pre-tilt data generating unit 1030, the over-drive data generating unit 1040, and the output unit 1050.

The compression unit 1015 compresses the previous frame data G(n−1) stored in the first frame memory 1010, and outputs the compressed previous frame memory G(n−1) to the second frame memory 1020*b*. The compression unit 1015 may compress the previous frame data G(n−1) outputted by the first frame memory 1010 with a predetermined block as a unit. The predetermined block as a unit for compressing frame data may be determined in various ways. The compression unit 1015 may have a storage capacity corresponding to the block as a unit. The compression unit 1015 may use various compression methods.

The second frame memory 1020*b* according to the present embodiment stores previous frame data G'(n−1) compressed by the compression unit 1015. In the present embodiment, the storage capacity of the second frame memory 1020*b* is smaller than that of the first frame memory 1010. Therefore, the second frame memory 1020*b* according to the present embodiment occupies a smaller space compared to the first frame memory 1010, and may occupy a smaller space compared to the second frame memory 1020 according to the previous embodiment.

The decompression unit 1025 decompresses the previous frame data G'(n−1) stored in the second frame memory 1020*b*, and outputs the decompressed previous frame data G'(n−1) to the pre-tilt data generating unit 1030 and the over-drive data generating unit 1040.

Figure 16:
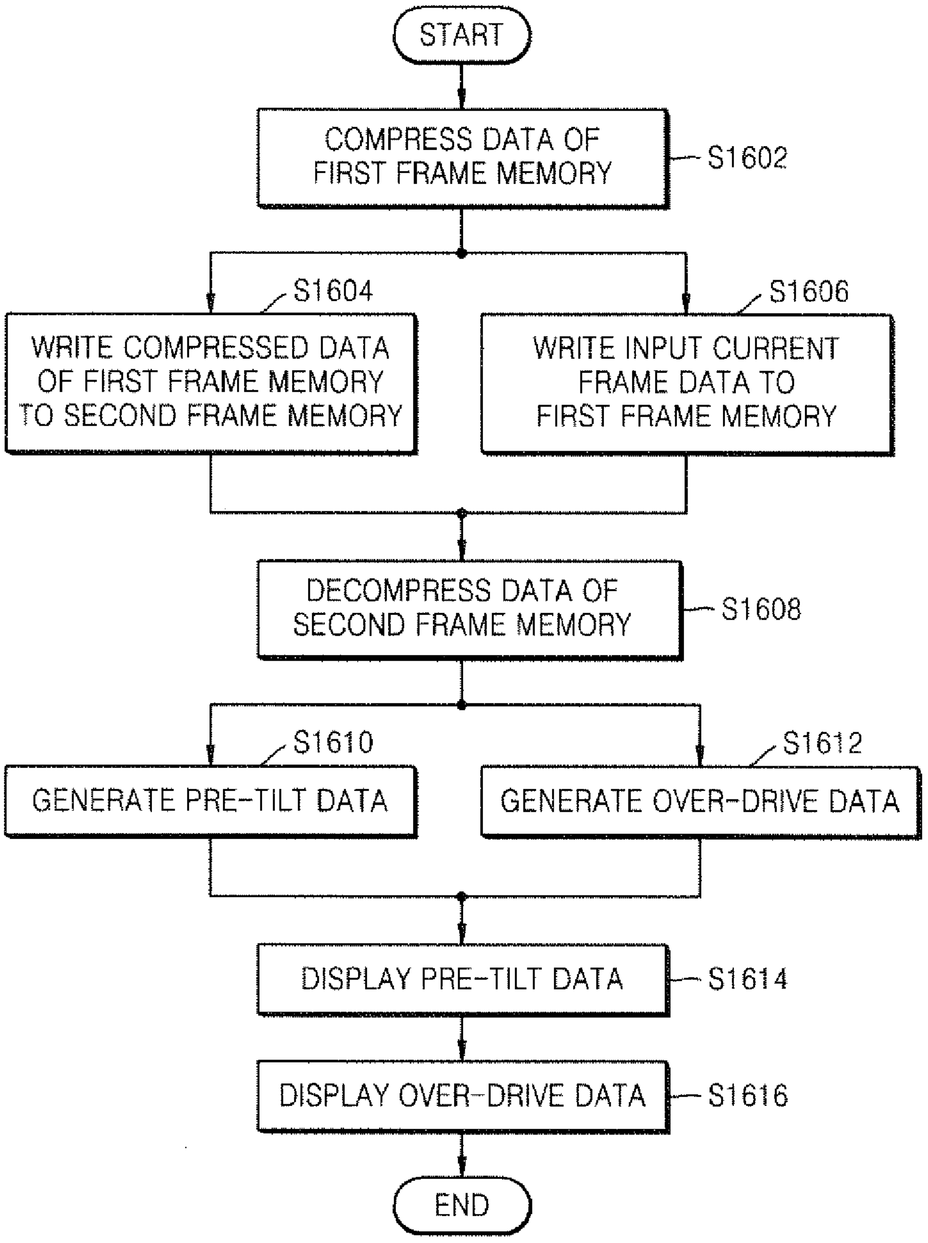
FIG. 16 is a flowchart showing a method of driving an LCD device according to another embodiment of the present invention.

FIG. 16 is a flowchart showing a method of driving an LCD device according to another embodiment of the present invention.

According to the present embodiment, before the current frame data G(n) is written to the first frame memory 1010, the previous frame data G(n−1) stored in the first frame memory 1010 is outputted to the compression unit 1015, and the compression unit 1015 compresses the previous frame data G(n−1) stored in the first frame memory 1010 (operation S1602). Compressed previous frame memory G'(n−1) is written to the second frame memory 1020*a* (operation S1604). Furthermore, when the previous frame data G(n−1) is outputted to the compression unit 1015, the input current frame data G(n) is written to the first frame memory 1010 (operation S1606).

Next, the previous frame data G'(n−1) stored in the second frame memory 1020*b* is decompressed (operation S1608), and is outputted to the pre-tilt data generating unit 1030 and the over-drive data generating unit 1040.

The pre-tilt data PT(n) and the over-drive data OD(n) are then generated by using the current frame data G(n) and the previous frame data G(n−1) (operations S1610 and S1612). The pre-tilt data PT(n) and the over-drive data OD(n) may be generated either simultaneously or sequentially.

Next, the pre-tilt data PT(n) is inputted to the pixel unit 140 and is displayed (operation S1614), and then the over-drive data OD(n) is inputted to the pixel unit 140 and is displayed (operation S1616).

While this invention has been particularly shown and described with reference to preferred embodiments thereof, it will be understood by those skilled in the art that various changes in form and detail may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of driving a liquid crystal display (LCD) device, the method comprising the steps of:
- generating pre-tilt data with respect to a current frame by using previous frame data and current frame data;
- generating over-drive data with respect to the current frame by using the previous frame data and the current frame data;
- sequentially outputting the pre-tilt data followed by the over-drive data;
- displaying the pre-tilt data with respect to the current frame; and
- displaying the over-drive data with respect to the current frame.

2. The method of claim 1, wherein a frequency of inputting frame data is lower than a frequency of driving the LCD device.

3. The method of claim 1, wherein a frequency of inputting frame data corresponds to 50% of a frequency of driving the LCD device.

4. The method of claim 1, wherein the LCD device uses a first frame memory for storing the current frame data and a second frame memory for storing the previous frame data.

5. The method of claim 4, further comprising the steps of:
- storing data of the first frame memory to the second frame memory when the current frame data is inputted; and
- storing the input current frame data to the first frame memory.

6. The method of claim 5, further comprising the steps of:
- compressing the data of the first frame memory before the data of the first frame memory is stored in the second frame memory; and
- decompressing the data of the second frame memory before the pre-tilt data is generated;
- wherein the second frame memory has a smaller storage capacity than the first frame memory.

7. The method of claim 4, wherein the data of the first frame memory is sequentially written to the second frame memory with a pixel array row of the LCD device as a unit; and
- wherein inputted current frame data is sequentially written to the first frame memory with the pixel array row of the LCD device as a unit.

8. The method of claim 1, wherein the step of generating the pre-tilt data comprises generating the pre-tilt data by using a pre-tilt look-up table for storing the pre-tilt data determined based on the previous frame data and the current frame data; and
- wherein the step of generating the over-drive data comprises generating the over-drive data by using an over-drive look-up table for storing the over-drive data determined based on the previous frame data and the current frame data.

9. The method of claim 1, wherein the pre-tilt data is more similar to the previous frame data than to the current frame data.

10. The method of claim 9, wherein, if the current frame data has a higher gray scale value than the previous frame data, the pre-tilt data has a higher gray scale value than the previous frame data;
- wherein, if the current frame data has a gray scale value the same as the previous frame data, the pre-tilt data has the same gray scale value as the previous frame data; and
- wherein, if the current frame data has a lower gray scale value than the previous frame data, the pre-tilt data has a lower gray scale value than the previous frame data.

11. The method of claim 1, wherein the over-drive data is more similar to the current frame data than to the previous frame data.

12. The method of claim 11, wherein, if the current frame data has a higher gray scale value than the previous frame data, the over-drive data has a higher gray scale value than the current frame data;

wherein, if the current frame data has a gray scale value the same as the previous frame data, the over-drive data has the same gray scale value as the current frame data; and wherein, if the current frame data has a lower gray scale value than the previous frame data, the over-drive data has a lower gray scale value than the current frame data.

13. An apparatus, comprising:

a pre-tilt data generating unit which generates pre-tilt data with respect to a current frame by using previous frame data and current frame data;

an over-drive data generating unit which generates over-drive data with respect to the current frame by using the previous frame data and the current frame data; and an output unit which sequentially outputs the pre-tilt data followed by the over-drive data.

14. The apparatus of claim 13, wherein a frequency of inputting frame data is lower than a frequency of driving the LCD device.

15. The apparatus of claim 13, wherein a frequency of inputting frame data corresponds to 50% of a frequency of driving the LCD device.

16. The apparatus of claim 13, further comprising:

a first frame memory for storing the current frame data; and a second frame memory for storing the previous frame data.

17. The apparatus of claim 16, wherein, when the current frame data is inputted, data of the first frame memory is stored in the second frame memory, and the input current frame data is stored in the first frame data.

18. The apparatus of claim 17, further comprising:

a compression unit which compresses the data of the first frame memory and stores the compressed data to the second frame memory; and a decompression unit which decompresses data of the second frame memory and provides the decompressed data to the pre-tilt data generating unit and the over-drive data generating unit;

wherein the second frame memory has a smaller storage capacity than the first frame memory.

19. The apparatus of claim 16, wherein the data of the first frame memory is sequentially written to the second frame memory with a pixel array row of the LCD device as a unit, and the input current frame data is sequentially written to the first frame memory with the pixel array row of the LCD device as a unit.

20. The apparatus of claim 13, wherein the pre-tilt data generating unit comprises a pre-tilt look-up table (LUT) storage unit, which stores a pre-tilt look-up table for storing the pre-tilt data determined based on the previous frame data and the current frame data, and generates the pre-tilt data by using the pre-tilt look-up table; and wherein the over-drive data generating unit comprises an over-drive LUT storage unit, which stores an over-drive look-up table for storing the over-drive data determined based on the previous frame data and the current frame data, and generates the over-drive data by using the over-drive look-up table.

21. The apparatus of claim 13, wherein the pre-tilt data is more similar to the previous frame data than to the current frame data.

22. The apparatus of claim 21, wherein, if the current frame data has a higher gray scale value than the previous frame data, the pre-tilt data has a higher gray scale value than the previous frame data;

wherein, if the current frame data has a gray scale value the same as the previous frame data, the pre-tilt data has the same gray scale value as the previous frame data; and wherein, if the current frame data has a lower gray scale value than the previous frame data, the pre-tilt data has a lower gray scale value than the previous frame data.

23. The apparatus of claim 13, wherein the over-drive data is more similar to the current frame data than to the previous frame data.

24. The apparatus of claim 23, wherein, if the current frame data has a higher gray scale value than the previous frame data, the over-drive data has a higher gray scale value than the current frame data;

wherein, if the current frame data has a gray scale value the same as the previous frame data, the over-drive data has the same gray scale value as the current frame data; and wherein, if the current frame data has a lower gray scale value than the previous frame data, the over-drive data has a lower gray scale value than the current frame data.

25. The apparatus of claim 13, further comprising a display unit which displays both the pre-tilt data with respect to the current frame and the over-drive data with respect to the current frame.

* * * * *